United States Patent Office
3,463,796
Patented Aug. 26, 1969

3,463,796
17α-ALKA-1',3'-DIYNYL STEROIDS AND PROCESS FOR PREPARING SAME
Peter Feather and Vladimir Petrow, London, England, assignors to The British Drug House Limited
No Drawing. Filed June 23, 1966, Ser. No. 559,737
Claims priority, application Great Britain, July 2, 1965, 28,063/65
Int. Cl. C07c 167/20, 169/10; A61k 17/00
U.S. Cl. 260—397.4                              20 Claims

ABSTRACT OF THE DISCLOSURE

This invention is for improvements in or relating to organic compounds and has particular reference to a new class of steroidal materials, namely the 17α-alka-1',3'-diynyl derivatives of perhydrocyclopentenophenanthrene and to a process for their preparation. The new compounds have utility for the control of fertility and other conditions of the reproductive system. They are produced by alkylating metal derivatives of the corresponding 17α-butadiynyl steroids.

---

The new compounds of the present invention have valuable biological properties. They may possess hormonal and anti-hormonal properties including oestrogenic, progestational, claudogenic, ovulation-inhibiting and gonadotrophin-inhibiting properties, which render the compounds of value in preparations for the control of fertility and in preparations for the treatment of a wide range of conditions and defects of the reproductive system. In general the Ring A aromatic compounds of the present invention may possess oestrogenic, claudogenic and gonadotrophin-inhibiting properties while the 3-oxo-Δ⁴- and 19-nor-compounds of the present invention may possess progestational and ovulation-inhibiting properties. The compounds of the present invention may be administered in the form of tablets, pills, injections, vaginal tampons and other standard pharmaceutical preparations.

It is an object of the present invention to provide new 17α-alka-1',3'-diynyl steroids having the partial Formula I below.

According to the present invention there is provided a process for the preparation of 17α-alka-1',3'-diynyl steroids having the partial formula

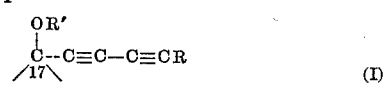
(I)

where R is an alkyl group containing not more than 5 carbon atoms and R' is H, Me, Et or tetrahydropyranyl which process comprises alkylating under anhydrous conditions a metal derivative of the corresponding 17α-butadiynyl steroid having the partial formula

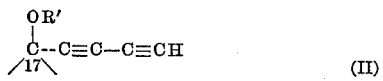
(II)

where R' has the same meaning as above.
The reaction may be represented thus:

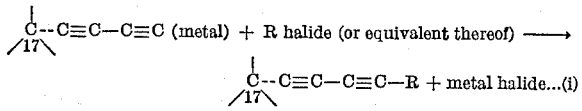

where R is as hereinabove defined.
According to the preferred method for carrying out the process of the invention, a derivative of a 17α-butadiynyl steroid having the partial Formula II in which the terminal atom of the butadiynyl chain has been displaced by an alkali-metal, such as lithium, sodium or potassium, is reacted with the appropriate alkyl halide in a suitable anhydrous medium, which is preferably a mixture of liquid ammonia and a non-hydroxylic organic solvent such for example as ether or tetrahydrofuran. The alkali-metal derivative, which is advantageously the sodium derivative, of the 17α-butadiynyl steroid may conveniently be prepared by adding a solution of the steroid in anhydrous tetrahydrofuran to the amide of the alkali-metal in liquid ammonia and stirring the mixture for up to 1 hour, or longer. The halide, which is advantageously the iodide, in quantity equivalent to the amide of the alkali-metal, or in slight excess thereof, dissolved if desired in an anhydrous organic solvent such as ether or tetrahydrofuran, may then be added, and the reaction allowed to proceed while the mixture is stirred for up to 24 hours, or longer, at a temperature between ca —70° C. and the reflux temperature of the mixture. The mixture may then be poured on to ice, or treated with solid ammonium chloride, the ammonia allowed to evaporate and water added, and the steroidal product may be collected by filtration or by extraction with a suitable organic solvent such as ether. The product may be purified by chromatography and/or crystallisation from a suitable solvent.

It has previously been shown (cf German Patent 1,062,698, and Belgian Patent No. 636,603) that a 17β-hydroxy group may react with an alkali-metal amide to form an alkali-metal derivative which may react with alkyl halides, including in particular methyl iodide and ethyl iodide, to form a 17β-alkyl ether. Thus we have found that the application of the process of the invention to a 17α-butadiynyl-17β-hydroxy steroid with a molar ratio of sodamide to steroid not less than approximately 2:1, employing methyl or ethyl iodide as the alkyl halide, results directly in the formation of the corresponding 17α-alka-1',3'-diynyl-17β-alkoxy steroid as the main product (where R=R'=Me or Et), while by using equimolar quantities of sodamide and steroid, there is obtained a mixture containing the 17α-alka-1',3'-diynyl-17β-alkoxy steroid, the 17α-butadiynyl-17β-alkoxy steroid and unchanged 17α-butadiynyl-17β-hydroxy steroid, which can be separated by thin layer chromatography and/or fractional crystallisation.

When R' is lower alkyl or tetrahydropyranyl in (II), it is advantageous to employ the alkali-metal amide in moderate excess, for example a 3-fold excess, when a favourable yield of the ω-substituted butadiynyl derivative may be obtained. Resulting 17α-alka-1',3'-diynyl-17β-tetrahydro-2'-pyranyloxy steroids may be converted, if desired, by hydrolysis in presence of acid, into the corresponding 17α-alka-1',3'-diynyl-17β-hydroxy steroids. The resulting 17α-alka-1',3'-diynyl-17β-hydroxy steroids may be converted, if desired, into corresponding 17β-alkoxy steroids, for example, by treatment with sodamide and the appropriate alkyl iodide in liquid ammonia.

When the alkali-metal derivative is the lithium derivative we have found that the application of the process of the invention to a 17α-butadiynyl-17β-hydroxy steroid employing a molar ratio of lithamide to steroid of not less than 1:1 (for example a 4-fold excess), employing methyl or ethyl iodide as the alkyl halide results in the formation of the corresponding 17α-alka-1',3'-diynyl-17β-hydroxy steroid.

The steroidal starting materials used in the process of the invention may be (a) 17α-butadiynyl-17β-hydroxy-steroids having the partial formula

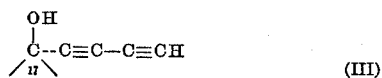
(III)

and may be prepared from appropriate 17-oxo steroids by the general process described by C. Burgess, D. Burn, P. Feather, M. Howarth and V. Petrow, Tetrahedron, 1965, 21, 1197, or by procedures described in British specification 961,502; (b) 17α-butadiynyl-17β-tetrahydropyranyloxy steroids having the partial formula

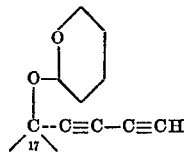

which may be prepared from 17α-butadiynyl-17β-hydroxysteroids by treatment with dihydropyran and a suitable catalyst such as p-toluene-sulphonic acid; or (c) 17α-butadiynyl-17β-methoxy and 17α-butadiynyl-17β-ethoxy steroids having the partial formula

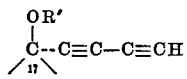

where R′ is Me or Et, which are formed when a 17α-butadiynyl-17β-hydroxy steroid is reacted with equimolar proportions of sodamide and the alkyl iodide and may be isolated by, for example, thin-layer chromatography. The steroidal starting materials may belong to standard steroidal series, such for example as the androstane, 19-nor-androstane, oestrane or oestratriene series.

It will be apparent to those skilled in the art, that the process of the invention may be applied to steroids containing, in addition to the 17α-butadiynyl and 17β-hydroxy, 17β-methoxy, 17β-ethoxy or 17β-tetrahydro-2′-pyranyloxy groups, a variety of substituents and unsaturated linkages in Rings A, B, C and D.

Hydroxyl groups, and in particular, hydroxyl groups at $C_1$, $C_3$, $C_4$, $C_5$, $C_6$ and $C_{11}$, may undergo alkylation during the process of the invention unless protected, for example by conversion into a tetrahydro-2′-pyranyloxy group and subsequently regenerated. The conversion of the hydroxyl group into a tetrahydro-2′-pyranyloxy group may be carried out on the appropriate 17-oxo-steroid prior to its conversion into the 17α-butadiynyl-17β-hydroxy-group, if so desired.

Acyloxy groups will, in general, be hydrolysed by the process of the invention, and may require subsequent regeneration.

Alkoxy groups including dialkylaminoalkoxy groups at $C_3$, $C_6$, $C_7$ and $C_{17}$, do not interfere with the process of the invention.

Alkyl and alkenyl groups containing up to 3 carbon atoms, and, in particular, methyl or methylene groups at $C_1$, $C_2$, $C_3$, $C_4$, $C_6$, $C_7$ and $C_{16}$, will not, in general, interfere with the process of the invention.

Unsaturated linkages, and in particular such linkages at $C_1$, $C_2$, $C_3$, $C_4$, $C_5$, $C_{5(10)}$, $C_6$, $C_7$, $C_8$, $C_{8(14)}$, $C_9$, $C_{9(11)}$, $C_{11}$ and $C_{14}$ and combinations of such unsaturated linkages including aromatic Rings A and/or B will not, in general, interfere with the process of the invention.

Carbonyl groups, and in particular such groups at $C_2$, $C_3$, $C_6$, $C_{11}$ and $C_{12}$, may interfere with the process of the invention and are preferably protected by, for example, conversion into a ketal, enol ether or enamine, and subsequently regenerated if so desired.

New 17α-alka-1′,3′-diynyl steroids provided by the present invention may belong to the androstane, 19-norandrostane, oestrane, oestratriene series and may optionally contain:—unsaturated linkages at Δ1, Δ2, Δ3, Δ4, Δ5, Δ5(10), Δ6, Δ7, Δ8, Δ9, Δ9(11), Δ11 or Δ14, or combinations of two or more such unsaturated linkages; hydroxyl groups at $C_1$, $C_3$, $C_4$, $C_5$, $C_6$, $C_{11}$ or $C_{17}$, or derived acyloxy groups containing not more than 5 carbon atoms, or combinations of two or more such groups; alkyl or alkenyl groups containing up to 3 carbon atoms, at $C_1$, $C_2$, $C_4$, $C_6$, $C_7$ or $C_{16}$, or combinations of two or more such groups; carbonyl groups at $C_2$, $C_3$, $C_6$, $C_{11}$ or $C_{12}$, or combinations of two or more such groups.

The new 17α-alka-1′,3′-diynyl steroids of the present invention may have one of the following formulae:

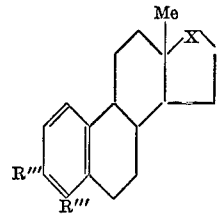

where R″=H, OH, or OR$^{IV}$ and R‴=H or Me (where R$^{IV}$=alkyl containing not more than 12 carbon atoms)

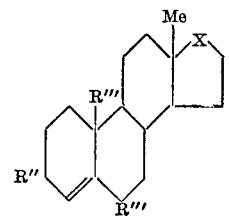

where R″=H$_2$ or: O, and R‴=H or Me

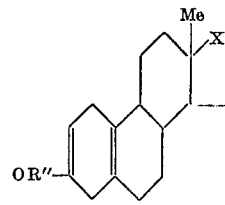

where R″=alkyl group containing up to 5 carbon atoms

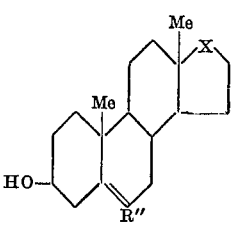

where R″=H or Me

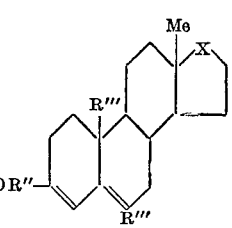

where R″=Me or Et, and R‴=H or Me and

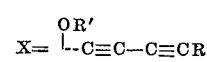

where R=an alkyl group containing not more than 5 carbon atoms, and R′=H, Me, Et or tetrahydropyranyl group.

Some of the products of the present invention, when crystallised from organic solvents, may be obtained as crystals containing solvent of crystallisation. When desired, such solvent of crystallisation may be largely removed by standard techniques, such as heating the solvated crystals at elevated temperatures and reduced pressures, or by sublimation in vacuo.

Following is a description by way of example of methods of carrying the invention into effect.

EXAMPLE 1

3,17β-dimethoxy-17-penta-1'3'-diynyl-oestra-1,3,5(10)-triene

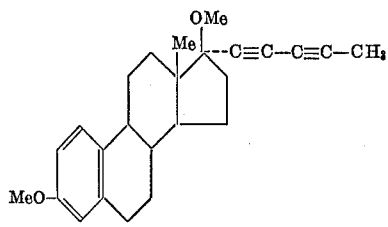

Liquid ammonia (100 ml.) containing sodium (0.5 g.) and a trace of ferric nitrate was stirred until the blue colour disappeared and then cooled to —60° C. 17α-butadiynyl-3-methoxy-oestra - 1,3,5(10)-trien-17β-ol (2.8 g.) in anhydrous tetrahydrofuran (40 ml.) was added during 10 minutes and the mixture was stirred for a further 30 minutes. Methyl iodide (1.4 ml.) in anhydrous tetrahydrofuran (6 ml.) was added during 10 minutes and the mixture was stirred for a further 2 hours and poured on to ice. The steroidal product was extracted with ether, the ethereal solution was evaporated at reduced pressure, and the residue, purified by chromatography on alumina, eluting with toluene, and by crystallisation from methanol, afforded 3,17β-dimethoxy-17α-penta-1',3'-diynyl-oestra-1,3,5(10)-triene, M.P. 112.5° C., $[\alpha]_D^{24}$ —62° (c, 0.24 in dioxan), $\lambda_{max.}$ 220 mμ (ε, 8850), $\lambda_{max.}$ 278 mμ (ε, 2040), $\lambda_{max.}$ 286 mμ (ε, 1910), $\nu_{max.}^{Nujol}$ 2283 cm.$^{-1}$ The product is a potent oestrogen and claudogenic agent. Thus, in the rat, the product has 10 times the uterotrophic activity of ethynyl oestradiol and >30 times the claudogenic activity of ethynyl oestradiol in the same animal species.

By applying the method of Example 1 to 17α-butadinynyl-19-norandrost-4-en-17β-ol (British Patent No. 961,502) or to 17α-butadiynyl-6α-methyl-19-norandrost-4-en-17β-ol (prepared from the 17-oxo-analogue by reaction with the sodium derivative of butadiyne, by the procedures described in British specification No. 961,502) there may be prepared 17β-methoxy-17α-penta-1',3'-dinyl-19-norandrost-4-ene and 17β-methoxy-6α-methyl-17α-penta-1',3'-diynyl-19-norandrost-4-ene.

EXAMPLE 2

3,17β-dimethoxy-17-penta-1'3'-diynyl-oestra-1,3,5(10)-triene

Liquid ammonia (200 ml.) containing sodium (0.32 g.) and a trace of ferric nitrate was stirred until the blue colour disappeared, and then cooled to —60° C. 17α-butadiynyl-3-methoxy-oestra-1,3,5(10)-trien-17β-ol (4.65 g.) in anhydrous tetrahydrofuran (100 ml.) was added during 10 minutes and the mixture was stirred for a further 10 minutes. Methyl iodide (4.5 g.) in anhydrous tetrahydrofuran (10 ml.) was added during 10 minutes and the mixture was stirred for a further 2 hours and then poured on to ice. The steroidal product was extracted with ether, the ethereal solution was evaporated at reduced pressure, and the residue was purified by thin-layer chromatography on silica-gel, eluting with benzene, and by crystallisation from methanol affording 2,17β-dimethoxy - 17α - penta-1',3'-diynyl-oestra-1,3,5(10)-triene, identical with the product of Example 1; 3,17β-dimethoxy-17α-butadiynyl-oestra-1,3,5(10)-triene, $\lambda_{max.}$ 278.5 mμ (ε, 1920), 287 mμ (ε, 1815);

$\nu_{max.}^{CH_2Cl_2}$ 3303, 2275, 2065, 1621, 1584, 1499 cm.$^{-1}$ was also obtained.

EXAMPLE 3

3,17β-dimethoxy-17α-penta-1',3'-diynyl-oestra-2,5(10)-diene

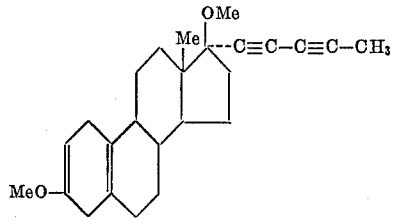

Liquid ammonia (200 ml.) containing sodium (0.75 g.) and a trace of ferric nitrate was stirred under reflux until the blue colour disappeared, and then cooled to —60° C. 17α - butadiynyl - 3 - methoxy - oestra - 2, 5(10)-dien-17β-ol (3.0 g.) in anhydrous tetrahydrofuran (100 ml.) was added during 10 minutes, and the mixture was stirred for a further 30 minutes. Methyl iodide (4.0 ml.) in anhydrous tetrahydrofuran (10 ml.) was added during 10 minutes and the mixture was stirred for a further 2 hours. Ammonium chloride (9 g.) was added, the ammonia was allowed to evaporate, water was added and the steroidal product was recovered by extraction with ether, and recrystallised from methanol containing a trace of pyridine, affording 3,17β-dimethoxy-17α-penta-1',3'-diynyl-oestra-2,5(10)-diene, $\nu_{max.}^{CCl_4}$ 2913, 2883, 2823, 2253, 1696, 1665.5, 1441.5, 1395.5 cm.$^{-1}$ The product has uterotrophic and oestrogenic activity. The product may be hydrolysed to yield the 3-oxo-Δ$^{5(10)}$-ene derivative.

17α-penta-1',3'-diynyl-17β-methoxy-19-norandrost-4-en-3-one

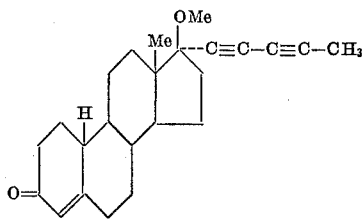

Dilute hydrochloric acid (3 N; 52.8 ml.) was added to 3,17β - dimethoxy - 17α - penta - 1',3' - diynyl - oestra-2,5(10)-diene (1.6 g.) in methanol (88 ml.) and the mixture was warmed at 60–65° C. for 15 minutes, cooled and poured into water. The steroidal product was collected by extraction with ether and purified by chromatography on alumina, eluting with toluene, affording 17α-penta-1',3'-diynyl-17β-methoxy-19-norandrost-4-en-3-one, $\nu_{max.}^{CCl_4}$ 2250, 1677, 1622, cm.$^{-1}$ $\lambda_{max.}$ 239 mμ (ε, 15600). The product has progestational activity, $[\alpha]_D^{27}$ —103° (c, 0.85 in dioxan).

EXAMPLE 4

17α-hexa-1',3'-diynyl-androst-5-en-3β,17β-diol

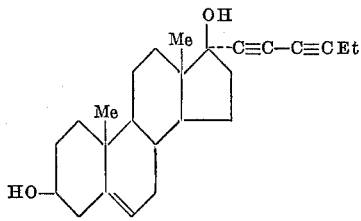

Anhydrous p-toluene-sulphonic acid (0.5 g.) in toluene (50 ml.) was added during 5 minutes to a stirred solution of 17α-butadiynyl-androst-5-en-3β,17β-diol (4.56 g.) and dihydropyran (24 ml.) in anhydrous tetrahydrofuran (80 ml.) at 10° C. and the mixture was stored in the dark at room temperature for 2 days and then poured into a saturated aqueous solution of potassium bicarbonate in water (200 ml.). The steroidal product was extracted with ether and crystallised from aqueous methanol containing a trace of pyridine, affording 3β,17β-bis(tetrahydro - 2' - pyranyloxy) - 17α - butadiynyl - androst - 5-ene, sufficiently pure for the next step, M.P. 68–73° C., $\nu_{max.}^{CCl_4}$ 3360, 2245, 2075 cm.$^{-1}$ Liquid ammonia (140 ml.) containing sodium (1.0 g.) and a trace of ferric nitrate was stirred under reflux until the blue colour disappeared and then cooled to —60° C. 3β,17β - bis(tetrahydro - 2' - pyranyloxy) - 17α - butadiynyl-androst-5-ene (4.0 g.) in anhydrous tetrahydrofuran (60 ml.) was added during 10 minutes and the mixture was stirred for a further 30 minutes. Ethyl iodide (8.0 g.) in anhydrous tetrahydrofuran (10 ml.) was added during 10 minutes and the mixture was stirred for a further 4 hours while being allowed to warm to reflux temperature and then poured on to ice. The steroidal product was collected by extraction with ether, dissolved in ethanol and treated with concentrated hydrochloric acid (0.25 g.) with gentle heating. Water was added until crystallisation occurred and, after cooling, the steroidal product was collected and crystallised from aqueous ethanol, affording 17α-hexa-1',3'-diynyl-androst-5-en-3β,17β-diol, M.P. 144 to 145° C., [α]$_D^{26}$—159° (c, 0.6 in dioxan).

The 6-methyl derivative may be prepared in the same way.

EXAMPLE 5

17α-penta-1',3'-diynyl-17β-methoxy-6α-methyl-19-norandrost-4-en-3-one

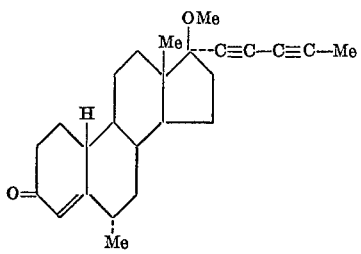

Liquid ammonia (75 ml.) containing sodium (0.46 g.) and a trace of ferric nitrate was stirred under reflux until the blue colour disappeared and then cooled to —60° C. 17α - butadiynyl - 3 - methoxy - 6 - methyl - 19-norandrosta-3,5-dien-17β-ol (1.75 g.) (British Patent No. 961,502) in anhydrous tetrahydrofuran (25 ml.) was added during 10 minutes and the mixture was stirred for a further 30 minutes. Methyl iodide (3.0 g.) in anhydrous tetrahydrofuran (10 ml.) was added during 10 minutes and the mixture was stirred for a further 2 hours while being allowed to warm to reflux temperature, and then poured on to ice. The steroidal product 17α-penta-1',3' - diynyl - 3,17β - dimethoxy - 6 - methyl - 19 - norandrosta-3,5-diene λ$_{max}$ 247 mμ (ε 19,265)

$\nu_{max.}^{CCl_4}$ 2240, 1653 and 1624 cm.$^{-1}$ was collected by extraction with ether, dissolved in methanol (100 ml.), treated at 60° C. for 15 minutes with 3 N hydrochloric acid (50 ml.), and recovered by dilution with water and extraction with ether. Recrystallisation from aqueous methanol afforded 17α-penta-1',3'-diynyl-17β - methoxy - 6α - methyl - 19 - norandrost - 4 - en-3-one, λ$_{max.}$ 240 mμ (ε, 15310), $\nu_{max.}^{CCl_4}$ 2278, 1682, 1620 cm.$^{-1}$

EXAMPLE 6

17α-penta-1',3'-diynyl-3-methoxy-oestra-1,3,5(10)-trien-17β-ol

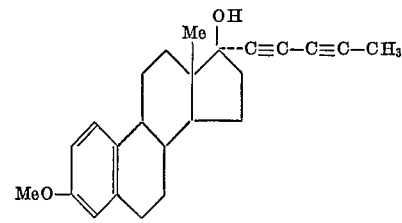

2,3-dihydropyran (7.5 ml.) and phosphoryl chloride (0.06 ml.) were added to 17α-butadiynyl-3-methoxy-oestra-1,3,5(10)-triene-17β-ol (3.0 g.) in anhydrous tetrahydrofuran (150 ml.). The mixture was allowed to stand at room temperature for 2½ hours and then poured into an aqueous solution of sodium bicarbonate. The steroidal product was extracted with ether, recovered by evaporation of the solvent at reduced pressure, dissolved in anhydrous tetrahydrofuran (100 ml.) and added to sodamide, prepared from sodium (0.23 g.), in liquid ammonia (200 ml.), at —60° C. The mixture was stirred for 15 minutes, treated with methyl iodide (2.5 ml.) in tetrahydrofuran (20 ml.), stirred for a further 2 hours, and poured on to ice. The steroidal product was extracted with ether, recovered by evaporation of the solvent at reduced pressure, and purified from methanol containing a drop of pyridine, affording 3-methoxy-17α-penta-1',3'-diynyl-17β-tetrahydro-pyranyloxy-oestra-1,3,5(10)-triene. This was dissolved in methanol (150 ml.), a drop of concentrated hydrochloric acid was added, the solution was boiled for 5 minutes and poured into water. The steroidal product was collected by extraction with ether and purified by chromatography on an alumina column, eluting with toluene, and by crystallisation, affording 17α-penta-1',3'-diynyl - 3 - methoxy-oestra-1,3,5(10)-trien-17β-ol, M.P. 131.5° C., [α]$_D^{29}$ —50° (c, 1.0 dioxan) λ$_{max}$ 279 mμ (ε 2,030), 287 mμ (ε 1,940)

$\nu_{max.}^{CS_2}$ 1253, 1043 cm.$^{-1}$, $\nu_{max.}^{CCl_4}$ 3607, 2240, 1609, 1592 cm.$^{-1}$

EXAMPLE 7

4-methyl-17β-methoxy-17α-penta-1',3'-diynyl-oestra-1,3,5(10)-triene

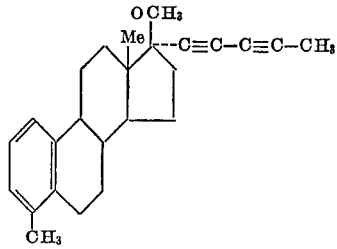

Liquid ammonia (100 ml.) containing sodium (0.5 g.) and a trace of ferric nitrate was stirred until the blue colour disappeared and then cooled to —60° C. 17α-butadiynyl - 4 - methyl-oestra-1,3,5(10)-trien-17β-ol (2.65 g.) in anhydrous tetrahydrofuran (40 ml.) was added during 10 minutes. The mixture was stirred for a further 30 minutes. Methyl iodide (1.4 ml.) in anhydrous tetrahydrofuran (6 ml.) was added during 10 minutes and the mixture was stirred for a further 2 hours and poured on to ice. The steroidal product was extracted with ether, the ethereal solution was evaporated at reduced pressure and the residue purified by chromatography on alumina, eluting with toluene and by crystallisation from methanol afforded 4-methyl - 17β - methoxy-17α-penta-1',3'-diynyl-oestra-1,3,5(10)-triene, λ$_{max}$ 241 mμ (ε, 375, 255 mμ (ε, 366), λinf 262 mμ (ε, 271), 269 mμ (ε, 186);

$\nu_{max.}^{CCl_4}$ 2255 cm.$^{-1}$ $\nu_{max.}^{CS_2}$ 777, 737 cm.$^{-1}$

EXAMPLE 8

17β-hydroxy-4-methyl-17α-penta-1',3'-diynyl-oestra-1,3,5(10)-triene

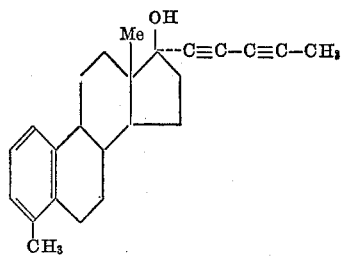

Anhydrous toluene-p-sulphonic acid (0.5 g.) in toluene (50 ml.) was added during 5 minutes to a stirred solution of 17α-butadiynyl-4-methyl-oestra-1,3,5(10)-triene-17β-ol (4.35 g.) and dihydropyran (24 ml.) in anhydrous tetrahydrofuran (80 ml.) at 10° C., and the mixture stored in the dark at room temperature for two days, and then poured into a saturated aqueous solution of potassium bicarbonate (200 ml.). The steroidal product was extracted with ether and crystallised from methanol containing a trace of pyridine affording 17β - (tetrahydro - 2'-pyranyloxy)-17α-butadiynyl-4-methyl-oestra-1,3,5(10)-triene.

Liquid ammonia (140 ml.) containing sodium (1.0 g.) and a trace of ferric nitrate was stirred until the blue colour had disappeared and then cooled to —60° C. 17β-(tetrahydro - 2' - pyranyloxy) - 17α-butadiynyl-4-methyl-oestra-1,3,5(10)-triene (3.7 g.) in anhydrous tetrahydrofuran (60 ml.) was added during 10 minutes and the mixture was stirred for a further 30 minutes. Methyl iodide (3.2 ml.) in anhydrous tetrahydrofuran (10 ml.) was added during 10 minutes and the mixture stirred for a further two hours and then poured on to ice. The steroidal product was collected by extraction with ether, dissolved in methanol and treated with concentrated hydrochloric acid (0.25 g.) with gentle heating. Water was added until crystallisation occurred and, after cooling, the steroidal product was collected and crystallised from methanol affording 17β - hydroxy - 4-methyl-17α-penta-1',3'-diynyl-oestra-1,3,5(10)-triene, M.P. 192.5° C., $[\alpha]_D^{27}$ —46° (c, 1.19 in dioxan).

EXAMPLE 9

17β-methoxy-17α-penta-1',3'-diynyl-oestra-1,3,5(10)-triene

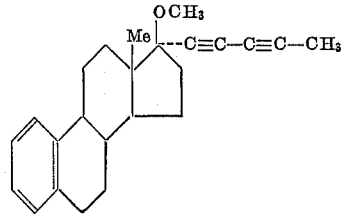

Liquid ammonia (200 ml.) containing sodium (0.32 g.) and a trace of ferric nitrate was stirred until the blue colour disappeared, and then cooled to —60° C. 17α - butadiynyl - oestra - 1,3,5(10) - trien - 17β - ol (4.2 g.) in anhydrous tetrahydrofuran (100 ml.) was added during 10 minutes and the mixture was stirred for a further 10 minutes. Methyl iodide (4.5 g.) in anhydrous tetrahydrofuran (10 ml.) was added during 10 minutes and the mixture was stirred for a further 2 hours and then poured on to ice. The steroidal product was extracted with ether, the ether solution was evaporated at reduced pressure, and the residue was purified by chromatography on alumina, eluting with toluene, and by crystallisation from methanol affording 17β-methoxy-17α-penta-1',3'-diynyl-oestra-1,3,5(10)-triene, $\lambda_{max.}^{EtOH}$ 242 mμ (ε, 428), 256.5 mμ (ε, 507), 274 mμ (ε, 498); $\nu_{max.}^{CCl_4}$ 2250 cm.$^{-1}$

EXAMPLE 10

17β-hydroxy-17α-penta-1',3'-diynyl-oestra-1,3,5(10)-triene

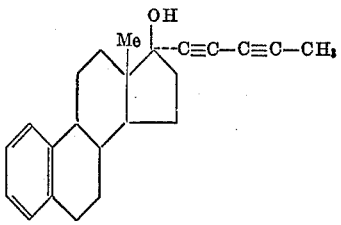

2,3-dihydropyran (7.5 ml.) and phosphoryl chloride (0.06 ml.) were added to 17α-butadiynyl-17β-hydroxy-oestra-1,3,5(10)-triene (2.73 g.) in anhydrous tetrahydrofuran (150 ml.). The mixture was allowed to stand at room temperature for 2½ hours and then poured into an aqueous solution of sodium bicarbonate. The steroidal product was extracted with ether, recovered by evaporation of the solvent at reduced pressure, dissolved in anhydrous tetrahydrofuran (100 ml.) and added to sodamide, prepared from sodium (0.23 g.) in liquid ammonia (200 ml.) at —60° C. The mixture was stirred for 15 minutes, treated with methyl iodide (2.5 ml.) in tetrahydrofuran (20 ml.), stirred for a further 2 hours, and poured on to ice. The steroidal product was extracted with ether, recovered by evaporation of the solvent at reduced pressure, dissolved in methanol (150 ml.). A drop of concentrated hydrochloric acid was added, the solution boiled for 5 minutes and poured into water. The steroidal product was collected by extraction with ether and purified by chromatography on an alumina column, eluting with toluene and by crystallisation from aqueous methanol, affording 17β-hydroxy - 17α - penta - 1',3' - diynyl-oestra-1,3,5(10)-triene.

$\lambda_{max.}^{EtOH}$ 266.5 (ε, 452), 274 mμ (ε, 435), $\nu_{max.}^{CCl_4}$ 3605, 2240 cm.$^{-1}$; $\nu_{max.}^{CS_2}$ 1379, 1358, 1292, 1051, 1020, 739 cm.$^{-1}$

EXAMPLE 11

3,17β-dimethoxy-17α-(hexa-1',3'-diynyl)-oestra-1,3,5(10)-triene

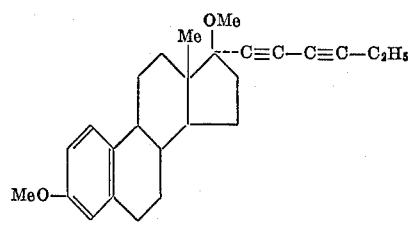

3,17β - dimethoxy - 17α - butadiynyl - oestra-1,3,5(10)-triene (1.24 g.) (prepared as described in Example 2) in anhydrous tetrahydrofuran (25 ml.) was added to sodamide (from 0.15 g. of sodium and a trace of ferric nitrate) in stirred liquid ammonia at —60° C. The mixture was stirred for 15 minutes, treated with ethyl iodide (1.25 g.) in anhydrous tetrahydrofuran (5 ml.), stirred for 2½ hours at —60° C., allowed to warm to reflux temperature during a further ½ hour and poured on to ice. The steroidal product was isolated by extraction with ether and purified by chromatography on alumina, eluting with toluene, and by crystallisation from methanol, affording 3,17β - dimethoxy - 17α - (hexa - 1',3' - diynyl)-oestra-1,3,5(10)-triene, as needles, NMR 6.23τ (17β-OMe), 6.60τ (3-OMe), 9.136τ (13 Me);

$\lambda_{max.}^{EtOH}$ 278 mμ (ε, 2045), $\lambda_{max.}^{EtOH}$ 287 mμ (ε, 1925); $\nu_{max.}^{CCl_4}$ 2242, 1609, 1498 cm.$^{-1}$; $\nu_{max.}^{CS_2}$ 1098 cm.$^{-1}$ M.P. 80.5° C., $[\alpha]_D^{21}$ —53° (c, 0.22 in dioxan).

EXAMPLE 12

17α-(n-hepta-1′,3′-diynyl)-3-methoxy-
oestra-1,3,5(10)-triene-17β-ol

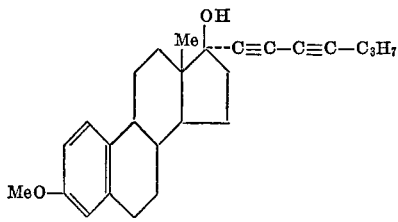

2,3-dihydropyran (32 ml.) and phosphoryl chloride (0.25 ml.) were added to a solution of 17α-butadiynyl-3-methoxy-oestra - 1,3,5(10) - triene-17β-ol (12.8 g.) (C. Burgess, D. Burn, P. Feather, M. Howarth and V. Petrow, Tetrahedron, 1965, 21, 1197) in anhydrous tetrahydrofuran (640 ml.). The mixture was stirred at room temperature for 2½ hours, and then poured into a solution of sodium bicarbonate (7 g.) in water. The steroidal product was isolated by extraction with ether, and the amorphous 17α-butadiynyl - 3 - methoxy-17β-(tetrahydro-2′-pyanyloxy)-oestra-1,3,5(10)-triene obtained was used for the next stage of the process.

The foregoing compound (8 g.) in anhydrous tetrahydrofuran (80 ml.) was added to sodamide (from 0.35 g. of sodium and a trace of ferric nitrate) in liquid ammonia (150 ml.) at −60° C. The mixture was stirred for 15 minutes, treated with n-propyl iodide (14 g.) in anhydrous tetrahydrofuran (25 ml.), stirred for a further 4 hours at −60° C., allowed to warm to reflux temperature during a further 30 minutes, and then poured on to ice. The steroidal product was isolated by extraction with ether and treated in ethanol (200 ml.) with concentrated hydrochloric acid (0.2 ml.). The mixture was heated briefly on the steam-bath, water was added, and the steroidal product was extracted with ether. Purification by thin-layer chromatography on silica-gel, eluting with toluene/ethyl acetate, and by crystallisation from hexane, afforded 17α-(n-hepta-1′,3′-diynyl)-3-methoxy - oestra-1,3,5(10)-trien-17β-ol, M.P. 65.5° C., $[α]_D$ −48.5° (c, 0.67 in dioxan);

$λ_{max.}^{EtOH}$ 220 mμ (ε, 8700), 279 mμ (ε, 1980), 287mμ (ε, 1890); $λ_{max.}^{EtOH}$ 259 mμ (ε, 587 mμ); $ν_{max.}^{CCl_4}$ 3610, 2240, 1610, 1497 cm.⁻¹; $ν_{max.}^{CS_2}$ 1256, 1044 cm.⁻¹

EXAMPLE 13

17α-(hexa-1′,3′-diynyl)-3-methoxy-oestra-1,3,5(10)-trien-17β-ol

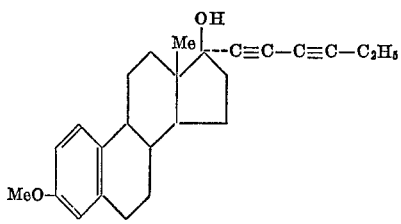

17α-butadiynyl-3-methoxy - 17β - (tetrahydro - 2′-pyranyloxy)-oestra-1,3,5(10)-triene (8 g.), prepared as described in the preceding example, in anhydrous tetrahydrofuran (65 ml.) was added to sodamide (from 0.35 g. of sodium and a trace of ferric nitrate) in liquid ammonia (175 ml.) at −60° C. The mixture was stirred for 30 minutes, treated with ethyl iodide (2.75 g.) in anhydrous tetrahydrofuran (15 ml.), stirred for a further 2 hours at −60° C., allowed to warm to reflux temperature during a further 1 hour, and poured on to ice. The steroidal product was isolated by extraction with ether and treated briefly in boiling methanol (1 litre) with 4 N hydrochloric acid (5 ml.).Water (250 ml.) was added and, after cooling, a precipitate was filtered off and discarded. The filtrate was freed from methanol at reduced pressure and the steroidal product was isolated with ether. Purification by thin-layer chromatography on silica-gel, which had been treated with silver nitrate, eluting with toluene/ethyl acetate, and crystallisation from hexane, afforded 17α-(hexa - 1′,3′ - diynyl) - 3 - methoxy - oestra-1,3,5(10)-trien-17β-ol, M.P. 66–69° C., $[α]_D^{30}$ −50° (c, 1.32 in dioxan);

$λ_{max.}^{EtOH}$ 278 mμ (ε, 2070); $λ_{max.}^{EtOH}$ 287 mμ (ε, 1960); $λ_{inf.}^{EtOH}$ 219 mμ (ε, 10000); $λ_{inf.}^{EtOH}$ 258 mμ (ε, 634); $ν_{max.}^{CCl_4}$ 3600, 2240, 1609, 1497 cm.⁻¹; $ν_{max.}^{CS_2}$ 1256, 1238, 1042 cm.⁻¹

EXAMPLE 14

17α-(penta-1′,3′-diynyl)-androst-5-ene-3β,17β-diol

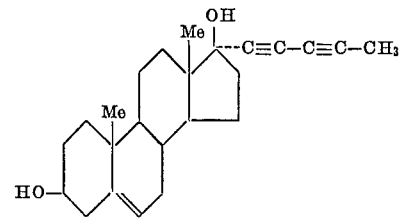

3β,17β-bis(tetrahydro - 2′ - pyranyloxy) - 17α - butadiynyl-androst-5-ene (4.0 g.) (prepared as described in Example 4) in anhydrous tetrahydrofuran (60 ml.) was added to sodamide (from 1.0 g. of sodium and a trace of ferric nitrate) in stirred liquid ammonia (150 ml.) at −60° C. The mixture was stirred for 30 minutes, methyl iodide (7.5 g.) in anhydrous tetrahydrofuran (20 ml.) was added, and stirring was continued for 2 hours at −60° C. and for an additional 30 minutes while warming to reflux temperature. The mixture was poured onto ice, and the steroidal product, isolated by extraction with ether, was treated in ethanol (100 ml.) with concentrated hydrochloric acid (0.25 ml.) with gentle heating. Water was added and the steroidal product was isolated by extraction with ether and purified by crystallisation from benzene and from aqueous methanol, affording 17α-(penta-1′,3′-diynyl)-androst - 5 - ene - 3β,17β - diol as colourless plates, M.P. 236° C., $[α]_D^{26}$ −167° (c, 0.90 in dioxan);

$λ_{max.}^{EtOH}$ 227 mμ (ε, 332); 241 mμ (ε, 338); 254.5 mμ (ε, 202); $ν_{max.}^{Nujol}$ 3490, 2230, 1045 cm.⁻¹

EXAMPLE 15

17β-ethoxy-17α-(hexa-1′,3′-diynyl)-3-methoxy-oestra-1,3,5(10)-triene

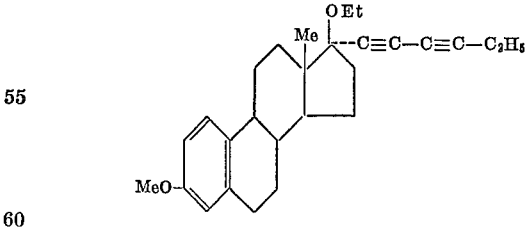

17α-butadiynyl-3 - methoxy - oestra - 1,3,5(10) - trien-17β-ol (4.0 g.) in anhydrous tetrahydrofuran (100 ml.) was added to sodamide (from 1.0 g. of sodium and a trace of ferric nitrate) in stirred liquid ammonia (150 ml.) at −70° C. The mixture was stirred for a further 20 minutes, ethyl iodide (10.0 g.) in anhydrous tetrahydrofuran (30 ml.) was added and stirring was continued for 5½ hours. The mixture was poured on to ice and the steroidal product was isolated by extraction with ether. Purification by chromatography on silica gel, eluting with toluene/ethyl acetate, and by crystallisation from methanol/methylene dichloride, afforded 17β-ethoxy-17α-(hexa-1′,3′ - diynyl) - 3 - methoxy - oestra-1,3,5(10)-triene M.P. 71.5° C., $[α]_D^{27}$ −42° (c, 0.85 in chloroform).

EXAMPLE 16

17β-hydroxy-17α-(penta-1',3'-diynyl)-19-norandrost-4-en-3-one

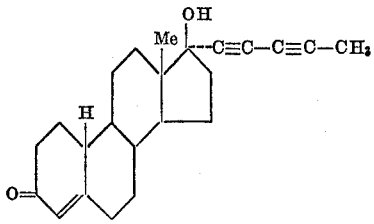

17α - butadiynyl-17β-hydroxy - 19 - norandrost-4-en-3-one (3.43 g.) and ethylene glycol (4.2 ml.) were added to benzene (200 ml.) and a small volume of solvent was distilled off to remove traces of moisture. Toluene-p-sulphonic acid (0.07 g.) was added and the mixture was heated under reflux for 4 hours with continuous removal of water. The cooled reaction mixture was diluted with ether, washed with a solution of potassium carbonate in water and then with water, dried and freed from solvent at reduced pressure, affording a mixture of the $\Delta^5$ and $\Delta^{5(10)}$-17α-butadiynyl - 17β - hydroxy-3-ethylenedioxy-19-norandrostenes, which was treated, in anhydrous tetrahydrofuran (200 ml.) with 2,3-dihydropyran (10.0 ml.) and phosphoryl chloride (0.08 ml.) for 2½ hours at room temperature. The resulting solution was added to aqueous sodium bicarbonate solution. The steroidal product was isolated by extraction with ether and the amorphous mixture of the $\Delta^5$ and $\Delta^{5(10)}$-17α-butadiynyl - 17β - (tetrahydro-2'-pyranyloxy)-3-ethylenedioxy - 19 - norandrostenes obtained was used for the next stage of the process.

The foregoing mixture (2.85 g.) in anhydrous tetrahydrofuran (75 ml.) was added to sodamide (from 0.27 g. of sodium and a trace of ferric nitrate) in liquid ammonia (100 ml.) at −60° C. The mixture was stirred for 10 minutes, treated with methyl iodide (2.28 g.) in anhydrous tetrahydrofuran (10 ml.), stirred for a further 2 hours at −60° C., allowed to warm to reflux temperature during a further 1 hour and then poured on to ice. The steroidal product was isolated by extraction with ether and treated in methanol (150 ml.) with 3 N hydrochloric acid (56 ml.) at 60° C. for 15 minutes. The methanolic solution was added to water and the steroidal product was isolated by extraction with ether. Purification by crystallisation from ether afforded 17β-hydroxy-17α-(penta-1',3'-diynyl)-19-norandrost - 4 - en-3-one, M.P. 117.5° C., $[\alpha]_D^{27}$ −94° C. (1.28 in dioxan);

$\lambda_{max.}^{EtOH}$ 239 mμ (ε, 16,150); $\nu_{max.}^{CCl_4}$ 3609, 2242, 1677, 1622 cm.$^{-1}$

EXAMPLE 17

17β-hydroxy-17α-(hexa-1'-3'-diynyl)-19-norandrost-4-en-3-one

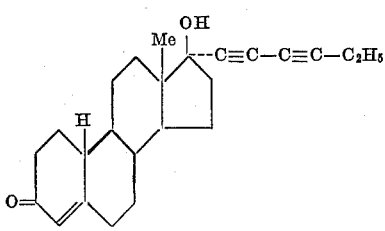

The mixture of $\Delta^5$ and $\Delta^{5(10)}$-17α-butadiynyl-17β-(tetrahydro-2'-pyranyloxy)-3-ethylenedioxy - 19 - norandrostenes (2.40 g.) (prepared in Example 16) in anhydrous tetrahydrofuran (70 ml.) was added to sodamide (from 0.23 g. of sodium and a trace of ferric nitrate) in liquid ammonia (100 ml.) at −60° C. The mixture was stirred for 10 minutes, treated with ethyl iodide (3.1 g.) in anhydrous tetrahydrofuran (10 ml.), stirred for a further 3 hours at −60° C., allowed to warm to reflux temperature during a further 1 hour, and then poured onto ice. The steroidal product was isolated by extraction with ether and treated in methanol (125 ml.) with 3 N hydrochloric acid (47 ml.) at 60° C. for 15 minutes. The methanolic solution was added to water and the steroidal product was isolated by extraction with ether. Purification by thin-layer chromatography on silica-gel, eluting with toluene/ethyl acetate, and by crystallisation from aqueous methanol, afforded 17β - hydroxy-17α-(hexa-1', 3'-diynyl) - 19 - norandrost-4-en-3-one, M.P. 163° C., $[\alpha]_D^{26}$ −101° (c, 0.6 in dioxan);

$\lambda_{max.}^{EtOH}$ 240 mμ (ε, 17,300); $\nu_{max.}^{CCl_4}$ 3605, 2235, 1670, 1620 cm.$^{-1}$; $\nu_{max.}^{CS_2}$ 1255, 1048 cm.$^{-1}$

EXAMPLE 18

17β-hydroxy-17α-(n-hepta-1',3'-diynyl)-19-norandrost-4-en-3-one

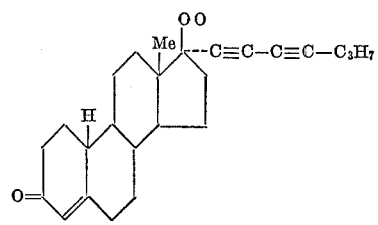

The mixture of $\Delta^5$ and $\Delta^{5(10)}$-17α-butadiynyl-17β-(tetrahydro-2'-pyranyloxy)-3-ethylenedioxy - 19 - norandrostenes (2.35 g.) (prepared in Example 16) in anhydrous tetrahydrofuran (70 ml.) was added to sodamide (from 0.23 g. of sodium and a trace of ferric nitrate) in liquid ammonia (100 ml.) at −60° C. The mixture was stirred for 10 minutes, treated with n-propyl iodide (3.4 g.) in anhydrous tetrahydrofuran (10 ml.), stirred for a further 3 hours at −60° C., allowed to warm to reflux temperature during a further 1 hour, and then poured on to ice. The steroidal product was isolated by extraction with ether and treated in methanol (125 ml.) with 3 N hydrochloric acid (46 ml.) at 60° C. for 15 minutes. The methanolic solution was added to water and the steroidal product was isolated by extraction with ether. Purification by thin-layer chromatography on silica-gel, eluting with toluene/ethyl acetate, and by crystallisation from aqueous methanol, afforded 17β-hydroxy-17α-(n-hepta-1', 3'-diynyl - 19 - norandrost-4-en-3-one, M.P. 199.5° C., $[\alpha]_D^{26}$ −95° (c, 1.0 in dioxan);

$\lambda_{max.}^{EtOH}$ 240 mμ (ε, 17,100); $\nu_{max.}^{Nujol}$ 3698, 1677, 1622 cm.$^{-1}$

EXAMPLE 19

17α-(penta-1',4'-diynyl)-17β-hydroxy-androst-4-en-3-one

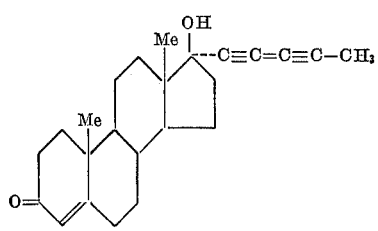

A small volume of solvent was distilled from a mixture of benzene (100 ml.), ethylene glycol (2.4 ml.) and 17α-butadiynyl-17β-hydroxy-androst-4-en-3-one (2.10 g.), to remove traces of moisture. Toluene-p-sulphonic acid (0.04 g.) was added and the mixture was heated under reflux for 4 hours, with continuous removal of water.

The cooled reaction mixture was diluted with ether, washed with a solution of potassium carbonate in water and then with water, dried and freed from solvent at reduced pressure giving amorphous 3-ethylenedioxy-17α-butadiynyl-17β-hydroxy-androst-5-ene which was treated, in anhydrous tetrahydrofuran (100 ml.), with 2,3-dihydropyran (5.0 ml.) and phosphoryl chloride (0.04 ml.) for 2½ hours at room temperature. The resulting solution was added to aqueous sodium bicarbonate solution. The steroidal product was isolated by extraction with ether and the amorphous 17α-butadiynyl-17β-(tetrahydro-2'-pyranyloxy)-3-ethylenedioxyandrost-5-ene obtained was used for the next stage of the process.

The foregoing compound (2.78 g.) in anhydrous tetrahydrofuran (75 ml.) was added to sodamide (from 0.23 g. of sodium and a trace of ferric nitrate) in liquid ammonia (100 ml.) at −60° C. The mixture was stirred for 10 minutes, treated with methyl iodide (2.0 g.) in anhydrous tetrahydrofuran (10 ml.), stirred for a further 2 hours at −60° C., allowed to warm to reflux temperature during a further 1 hour, and then poured on to ice. The steroidal product was isolated by extraction with ether and the 17α-(penta-1',3'-diynyl))-17β-(tetrahydro-2'-pyranyloxy) - 3 - ethylenedioxy-androst-5-ene obtained was treated in methanol (150 ml.) with 3 N hydrochloric acid (52.5 ml.) at 60° C. for 15 minutes. The methanolic solution was poured into water and the steroidal product was isolated by extraction with ether. Purification by chromatography on alumina, eluting with toluene/ether, and by crystallisation from benzene, afforded crystalline 17α - (penta-1',3'-diynyl)-17β-hydroxy-androst-4-en-3-one, M.P. 134.5° C., $[\alpha]_D^{27}$ −45° (c., 1.20 in dioxan); $\lambda_{max.}$ 241 mμ (ε, 14,900). The crystals contained benzene of crystallisation which was removed by heating at 130° C. in high vacuum, to give an amorphous product.

EXAMPLE 20

17α-(hexa-1'3'-diynyl)-17β-hydroxy-androst-4-en-3-one

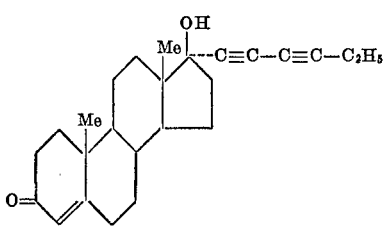

17α-butadiynyl - 17β - (tetrahydro - 2' - pyranyloxy)-3-ethylenedioxy-androst-5-ene (2.70 g.) (prepared as described in Example 19) in anhydrous tetrahydrofuran (75 ml.) was added to sodamide (from 0.23 g. of sodium and a trace of ferric nitrate) in liquid ammonia (100 ml.) at −60° C. The mixture was stirred for 10 minutes, treated with ethyl iodide (4.0 g.) in anhydrous tetrahydrofuran (10 ml.), stirred for a further 3 hours at −60° C., allowed to warm to reflux temperature during a further 1 hour, and then poured on to ice. The steroidal product was isolated by extraction with ether and treated in methanol (150 ml.) with 3 N hydrochloric acid (51 ml.) at 60° C. for 15 minutes. The methanolic solution was poured into water and the steroidal product was isolated by extraction with ether. Purification by thin-layer chromatography on silica-gel, eluting with toluene/ethyl acetate, and by crystallisation from acetone/hexane afforded 17α-(hexa-1',3'-diynyl)-17β-hydroxy-androst-4-en-3-one, M.P. 125° C., $[\alpha]_D^{27}$ −38° (c., 0.62 in dioxan);

$\lambda_{max.}^{EtOH}$ 240 mμ (ε, 14,200)

containing acetone. Removal of the acetone in vacuo at 130–140° C. afforded the compound in an amorphous state, $[\alpha]_D^{26}$ −39° (c., 0.84 in doxan).

EXAMPLE 21

17α-(penta-1',3'-diynyl)-oestra-1,3,5(10)-triene-3,17β-diol

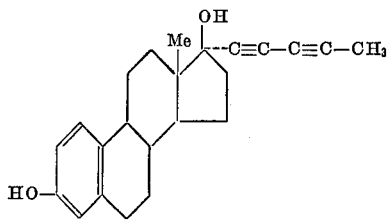

A mixture of 2,3-dihydropyran (10 ml.), 17α-butadiynyl-oestra-1,3,5(10)-triene-3,17β-diol (2.21 g.), phosphoryl chloride (0.05 ml.) and anhydrous tetrahydrofuran (150 ml.) was stirred at room temperature for 2½ hours and poured into a solution of sodium bicarbonate (1.5 g.) in water. The steroidal product was isolated by extraction with ether, and the 17α-butadiynyl-3,17β-bis(tetrahydro-2'-pyranyloxy)-oestra-1,3,5(10)-triene obtained, in anhydrous tetrahydrofuran (40 ml.) was added to sodamide (from 0.23 g. of sodium and a trace of ferric nitrate) in liquid ammonia (70 ml.) at −60° C. The mixture was stirred for 15 minutes, treated with methyl iodide (2.28 g.) in anhydrous tetrahydrofuran (5 ml.), stirred for 3 hours at −60° C., allowed to warm to reflux temperature during 30 minutes and then poured onto ice. The steroidal product was isolated by extraction with ether and treated in ethanol (75 ml.) with concentrated hydrochloric acid (0.1 ml.). The mixture was heated briefly on the steambath, water was added, and the steroidal product was extracted with ether. Purification by chromatography on alumina, eluting with toluene/ether mixtures and with ether, and by crystallisation from ether/petroleum ether, afforded 17α-(penta-1',3'-diynyl)-oestra-1,3,5(10)-triene-3,17β-diol, M.P. 148–158° C., [effervescent] $\lambda_{max.}$ 281 mμ (ε, 1,870), $\lambda_{inf}$ 287 mμ (ε, 1,700), $[\alpha]_D^{30}$ −48° (c., 0.81 in dioxan).

EXAMPLE 22

17α-(penta-1',3'-diynyl)-3-methoxy-oestra-1,3,5(10)-trien-17β-ol

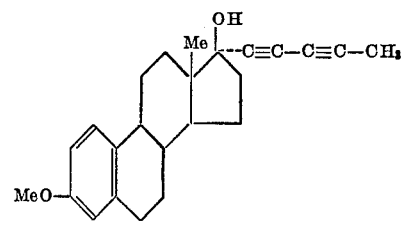

17α - butadiynyl - 3 - methoxy - oestra - 1,3,5(10)-trien - 17β - ol (3.34 g.) in anhydrous tetrahydrofuran (45 ml.) was added to lithamide (from 0.28 g. of lithium and a trace of ferric nitrate) in liquid ammonia (100 ml.) at −70° C. The mixture was stirred for 45 minutes, treated with methyl iodide (9 g.) in anhydrous tetrahydrofuran (10 ml.), stirred for 2 hours at −70° C., allowed to warm to reflux temperature during a further 1 hour, and poured on to ice. The steroidal product was isolated by extraction with ether. Purification by thin-layer chromatography on silica-gel, which had been treated with silver nitrate, eluting with toluene/ethyl acetate, and crystallisation from hexane afforded 17β - (penta - 1', 3' - diynyl) - 3 - methoxy-oestra-1,3,5(10)-trien-17β-ol, identical with the product of Example 6.

We claim:

1. A process for the preparation of 17α - alka - 1',3'-diynyl steroids having the partial formula

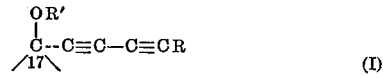

where R is an alkyl group containing not more than 5 carbon atoms and R' is H, Me, Et or tetrahydropyranyl which process comprises alkylating under anhydrous conditions a metal derivative of the corresponding 17α-butadiynyl steroid having the partial formula

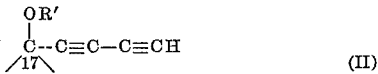 (II)

where R' has the same meaning as above.

2. A process as claimed in claim 1 wherein a derivative of 17α-butadiynyl steroid having the partial Formula II in which the terminal atom of the butadiynyl chain has been displaced by an alkali-metal is reacted with the appropriate alkyl halide in an anhydrous medium.

3. A process as claimed in claim 2 wherein the alkali-metal derivative of the 17α - butadiynyl steroid is prepared by adding a solution of the steroid in anhydrous tetrahydrofuran to the amide of the alkali-metal in liquid ammonia.

4. A process as claimed in claim 3 wherein the alkali-metal derivative is the lithium derivative, the molar ratio of lithamide to 17α - butadiynyl - 17β - hydroxy steroid is not less than 1.1 employing an alkyl halide containing not more than 5 carbon atoms and the corresponding 17α-alka-1',3'-diynyl-17β-hydroxy steroid is formed.

5. A process as claimed in claim 3 wherein the molar ratio of sodamide to 17α - butadiynyl - 17β - hydroxy steroid is not less than 2:1 employing methyl or ethyl iodide as the alkyl halide and the corresponding 17α-alka-1',3'-diynyl-17β-alkoxy steroid is formed directly as the main product.

6. A process as claimed in claim 3 wherein when R' is lower alkyl or tetrahydropyranyl the alkali-metal amide is employed in a 3-fold excess.

7. 3,17β - dimethoxy - 17α - penta-1',3'-diynyl-oestra-1,3,5(10)-triene.

8. 3,17β - dimethoxy - 17α - penta-1',3'-diynyl-oestra-2,5(10)-diene.

9. 17α - penta - 1',3' - diynyl - 17β-methoxy-19-nor-androst-4-en-3-one.

10. 17α-hexa-1',3'-diynyl-androst-5-en-3β,17β-diol.

11. 17α - penta - 1',3 - diynyl-3-methoxy-oestra-1,3,5(10)-trien-17β-ol.

12. 17β - hydroxy - 4 - methyl-17α-penta-1',3'-diynyl-oestra-1,3,5(10)-triene.

13. 17β - hydroxy - 17α - penta-1',3'-diynyl-oestra-1,3,5(10)-triene.

14. 17β - ethoxy - 17α - (hexa-1',3'-diynyl)-3-methoxy-oestra,1,3,5(10)-triene.

15. 17α - penta - 1',3' - diynyl-17β-hydroxy-androst-4-en-3-one.

16. 17α-alka-1',3'-diynyl steroids having the formula

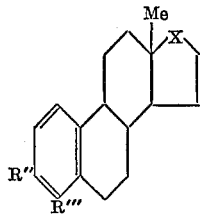

where R''=H, OH, or OR^IV and R'''=H or Me (where R^IV=alkyl containing not more than 12 carbon atoms) and

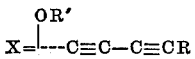

where R=an alkyl group containing not more than 5 carbon atoms, and R'=H, Me, Et or tetrahydropyranyl group.

17. 17α - alka - 1',3' - diynyl steroids having the formula

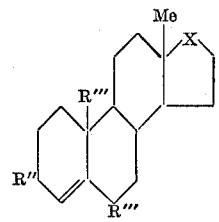

where R''=H₂ or :O, and R'''=H or Me and

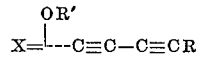

where R=an alkyl group containing not more than 5 carbon atoms, and R'=H, Me, Et or tetrahydropyranyl group.

18. 17α-alka-1',3'-diynyl steroids having the formula

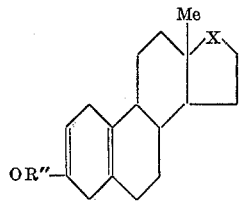

where R''=alkyl group containing up to 5 carbon atoms and

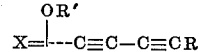

where R=an alkyl group containing not more than 5 carbon atoms, and R'=H, Me, Et or tetrahydropyranyl group.

19. 17α-alka-1',3'-diynyl steroids having the formula

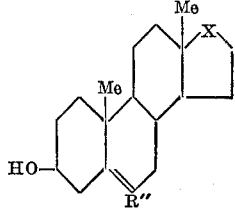

where R''=H or Me and

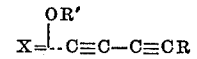

where R=an alkyl group containing not more than 5 carbon atoms, and R'=H, Me, Et or tetrahydropyranyl group.

20. 17α-alka-1',3'-diynyl steroids having the formula

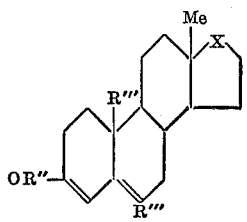

where R''=Me or Et, and R'''=H or Me and

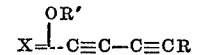

where R=an alkyl group containing not more than 5 carbon atoms, and R'=H, Me, Et or tetrahydropyranyl group.

References Cited

UNITED STATES PATENTS 3,164,617   1/1965   Feather et al. _____ 260—397.4

ELBERT L. ROBERTS, Primary Examiner

U.S. Cl. X.R.

260—239.55, 397.5, 999